US007000862B2

(12) United States Patent
Takahashi

(10) Patent No.: US 7,000,862 B2

(45) Date of Patent: Feb. 21, 2006

(54) MAGNETIC TAPE CARTRIDGE

(75) Inventor: Daisuke Takahashi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 17 days.

(21) Appl. No.: 10/657,185

(22) Filed: Sep. 9, 2003

(65) Prior Publication Data

US 2004/0124303 A1 Jul. 1, 2004

(30) Foreign Application Priority Data

Sep. 11, 2002 (JP) ......................... P. 2002-265584

(51) Int. Cl.
*G11B 23/107* (2006.01)

(52) U.S. Cl. .................................... 242/348.2; 360/132

(58) Field of Classification Search ............. 242/346.1, 242/346.2, 348, 348.2; 360/132
See application file for complete search history.

(56) References Cited

U.S. PATENT DOCUMENTS 3,064,913 A * 11/1962 Badeau, Sr. ............. 242/417.3
4,881,696 A * 11/1989 Mizutani et al. ......... 242/343.1
5,927,633 A * 7/1999 McAllister ............... 242/348.2

FOREIGN PATENT DOCUMENTS

JP 8-195063 A 7/1996

* cited by examiner

*Primary Examiner*—John Q. Nguyen
(74) *Attorney, Agent, or Firm*—Sughrue Mion, PLLC

(57) ABSTRACT

A magnetic tape cartridge has: a single reel with a magnetic tape wound thereon; a cartridge case rotatably storing the single reel therein; a tape pull-out leader pin fixed to the leading end portion of the magnetic tape and releasably held within the cartridge case; a tension absorbing unit for absorbing the tension of the magnetic tape disposed inside a holding portion for holding the leader pin.

2 Claims, 7 Drawing Sheets

MAGNETIC TAPE CARTRIDGE

BACKGROUND OF THE INVENTION

1. Field of the Invention

The present invention relates to a magnetic tape cartridge in which a single reel with a magnetic tape wound thereon is rotatably stored within a cartridge case and, in particular, to absorption of variations in the tension of the magnetic tape.

2. Description of the Related Art

Conventionally, as a magnetic tape cartridge which has been used as a recoding medium for use in external memory such a computer, there is known a magnetic tape cartridge of a type that a magnetic tape cartridge in which a single reel with a magnetic tape wound thereon is rotatably stored within a cartridge case.

A magnetic tape cartridge of this single reel type is structured in the following manner: that is, in case where it is set in the external memory, the magnetic tape wound on the reel is pulled out from the cartridge case by a drive mechanism disposed on the external memory side, and information is recorded in the magnetic recording part of the external memory or information already recorded in the recording part is read out by the reproducing part of the external memory; and, after then, the magnetic tape is rewound on the reel and is stored into the cartridge case again.

And, on the free end portion (which is the leading end portion on the tape play-out side) of the magnetic tape, there is fixedly disposed a leader pin which allows the drive mechanism of the external memory to play out the tape smoothly and introduce the tape into a tape traveling passage including the recording part and reproducing part of the memory. The drive mechanism of the memory grips the leader pin and introduces the tape into the memory to thereby set it in a given tape traveling passage.

FIG. 5 is an exploded perspective view of an example of a conventionally known magnetic tape cartridge of the above type. In FIG. 5, a magnetic tape cartridge 10 is structured such that a single supply reel 40 composed of an upper reel 41 and a lower reel 42 is rotatably stored into a cartridge case composed of an upper case 20 and a lower case 30 fastened together, and a magnetic tape 9 is wound on the supply reel 40.

The lower reel 42 is made of synthetic resin and is an integral body composed of a cylindrical-shaped reel hub 421 on the outer periphery of which the magnetic tape 9 can be wound, and a flange 422 projected in the diameter direction of the reel 42 from the lower end outer periphery of the reel hub 421; and, on the outer surface of the bottom portion of the reel hub 421, there is mounted a reel plate 53 to which magnet-type rotation drive means for driving and rotating the supply reel 40 can be connected.

Also, in the inner surface of the bottom portion of the reel hub 421, there is formed a restricting gear 42A which can be meshingly engaged with a restricting gear 52A formed in a brake button 52 to restrict the rotation of the supply reel 40 when it is not in use.

Further, in the reel hub 421, there is formed an opening 42B through which a drive removing spindle disposed in a recording and reproducing apparatus such as external memory using the magnetic tape cartridge 10 can be inserted to thereby move the brake button 52 upwardly.

In the brake button 52, on the side thereof that is opposed to the reel hub 421, there is formed the above-mentioned restricting gear 52A; and, in the surface thereof on the opposite side to the restricting gear 52A, there is formed a fit groove 52B into which a brake guide projection (not shown) formed in the upper case 20 can be fitted.

And, the brake button 52 is mounted in the interior of the reel hub 421 in such a manner that it is energized downwardly in FIG. 5 by a coil spring 51 and, in case where the restricting gear 52A of the brake button 52 and the restricting gear 42A of the reel hub 421 are meshingly engaged with each other, the supply reel 40 can be prevented from rotating when it is not in use.

On the other hand, when the magnetic tape cartridge is in use, in case where the drive removing spindle (not shown) of the recording and reproducing apparatus presses against the brake button 52, the brake button 52 is moved upwardly in FIG. 5 against the energization force of the coil spring 51, thereby removing the mutual meshing engagement between the restricting gears 52A and 42A, so that the supply reel 40 can be rotated freely.

In one side wall of the cartridge case 10, there is formed an opening 32 which is used to play out the magnetic tape 9. On the opening 32, there is mounted a slide door 31 which can be moved in a direction parallel to the side wall of the cartridge case 10. The slide door 31 is energized in a direction to close the opening 32.

Also, one end portion of the long magnetic tape 9 is fixed to the reel hub 421 and, on the free end portion of the magnetic tape 9 that is the outer-periphery-side end portion thereof when the magnetic tape 9 is mounted on the reel hub 421, there is fixedly disposed a leader pin 80 which allows the drive mechanism of the recording and reproducing apparatus to play out the magnetic tape 9 from the cartridge case 10 smoothly and introduce the magnetic tape 9 into the tape traveling passage including the recording part and reproducing part of the recording and reproducing apparatus.

The leader pin 80 is secured at a given position within the case by a leader pin hold portion (reference number 81 in FIG. 6, 81) not only in order that it can be easily gripped by the drive mechanism but also in order to be able to prevent the magnetic tape 9 from being played out from the case unexpectedly; and, in part of the leader pin 80, there is formed a portion to be held which can be held by a hold portion which is formed on the case side.

Now, FIG. 6 is a schematic plan view of the recording and reproducing apparatus to explain the functions of the recording and reproducing apparatus into which the cartridge case 10 shown in FIG. 5 has been incorporated.

The magnetic recording and reproducing apparatus 1 is an apparatus on which information can be written while winding up the magnetic tape 9 or from which written information can be read out. In structure, the magnetic recording and reproducing apparatus 1 comprises a mounting part 2 for mounting therein the cartridge case 10 incorporating therein the supply reel 40 with the magnetic tape 9 wound thereon, a winding part 3 for storing a blank take-up reel 6 for taking up the magnetic tape 9 thereon, a read/write head 7, and a large number of rollers 8 for guiding the magnetic tape 9 into a given passage.

When the cartridge case 10 is mounted into the mounting part 2 and the magnetic reproducing and reproducing apparatus 1 is started, the drive mechanism (not shown) of the magnetic recording and reproducing apparatus 1 removes the leader pin 80 from the leader hold portion 81 and pulls it out from the cartridge case 10, and the magnetic tape 9, while being guided by the large number of rollers 8, is moved through the read/write head 7 of the magnetic recording and reproducing apparatus 1 and is then taken up on the take-up reel 6. During this, information is read and written on the read/write head 7.

After completion of this read/write operation, the magnetic tape 9 is returned from the take-up reel 6 into the cartridge case 10 along the reversed passage.

However, in the above-mentioned conventional magnetic recording and reproducing apparatus, in the tape traveling passage formed in the interior of the magnetic recording and reproducing apparatus, there are disposed only the read/write head 7 and large number of rollers 8, but there is no system for absorbing variations in the tension of the magnetic tape and the rickety motion of the magnetic tape. The reason for this is that variations in the tension of the magnetic tape conventionally do not raise any problem.

However, although it is not a magnetic recording and reproducing apparatus, there is known a cassette tape manufacturing apparatus which includes a dancer roll for adjusting the tension of a magnetic tape (for example, see JP-A-8-195063).

Now, FIG. 7 is a structure view of a magnetic tape take-up apparatus disclosed in the JP-A-8-195063, showing an example of a system for energizing the tension of a magnetic tape. This is a magnetic tape take-up apparatus which supplies a magnetic tape to an empty tape cassette to thereby manufacture a cassette with a magnetic tape incorporated therein, in which a magnetic tape wound on a supply reel. That is, a magnetic tape from a pancake is taken up on a tape cassette reel having a given length; and, in this tape take-up operation, it adjusts the tension of the magnetic tape.

In FIG. 7, reference number 70 designates the present magnetic tape take-up apparatus. 71 stands for a pancake in which a magnetic tape 72 is wound on a supply reel 71*a*. The magnetic tape 72 played out from the pancake 71 is firstly fed to a length measuring roller 73 for measuring the length of the magnetic tape 72 having passed through the roller 73, is then fed to a dancer roll 74 for adjusting the tension of the magnetic tape 72, and is finally taken up on the reel of a tape cassette 76 through a guide roller 75.

In the traveling passage of the magnetic tape 72 between the length measuring roller 73 and dancer roll 74, there is separately disposed a splice device (not shown) which cuts the magnetic tape 72 and bonds the cut portion of the magnetic tape 72 to a leader tape disposed on the reel of the tape cassette 76.

Specifically, firstly, the magnetic tape 72 is played out from the pancake, the leading end of the cut portion of the magnetic tape 72 cut by the splice device is connected to the leading end of the leader tape disposed on one reel of the tape cassette 76 using an adhesive tape and, after then, the magnetic tape 72 is taken up onto one reel of the tape cassette 76 at a relatively high speed. In this case, when the length measuring roller 73 measures that the magnetic tape 72 has passed therethrough by a given length, the magnetic tape 72 is caused to stop, the magnetic tape 72 is next cut using the splice device, the leading end of the cut portion of the magnetic tape 72 is connected to the leading end of the leader tape of the other reel of the tape cassette 76 using an adhesive tape. The magnetic tape 72 is then wound into the tape cassette 76, thereby completing the take-up of the magnetic tape 72 of one tape cassette 76.

The above operations are carried out repeatedly from now on, thereby being able to mass produce tape cassettes 76 each with the magnetic tape 72 wound thereinto.

As described above, the dancer roll 74 used in the above apparatus is used to adjust the tension of the magnetic tape 72 when winding the magnetic tape 72 into the tape cassette 76. More specifically, the dancer roll 74 is used to adjust the tension of the magnetic tape 72 when manufacturing the tape cassette but not to adjust the tension of the magnetic tape 72 when using it in a recording system.

Also, since the tape tension absorbing system of the above apparatus is disposed within the traveling passage of the magnetic tape, not only there is necessary an installation space for the system but also it takes extra time and labor to wind the magnetic tape on the tension absorbing system.

Thus, although the tension of the tape in manufacturing the tape cassette is disclosed in the cited JP-A-8-195063, as described above, in the tape traveling passage of the magnetic recording and reproducing apparatus, there is not disposed a system for absorbing variations in the tension of the magnetic tape and the rickety motion of the magnetic tape; nor is present any apparatus which suggests the need of such tension variation absorbing system. This is because, conventionally, no attention has been paid to variations in the tension of the magnetic tape.

However, the present applicants have found that, since high-density recording reduces the recording area, the tension variations have an ill influence on the high-density recording.

Even in case where there is employed, as a tape tension absorbing unit to avoid the above ill influence, the tape tension absorbing unit disclosed in the JP-A-8-195063, there is separately necessary a space for installation of the tension absorbing unit and also it takes extra time and labor to wind the magnetic tape on the tension absorbing unit.

SUMMARY OF THE INVENTION

The present invention aims at eliminating the drawbacks found in the above-mentioned conventional magnetic tape cartridge. Accordingly, it is an object of the invention to provide a magnetic tape cartridge for use in the tape passing passage of a magnetic recording and reproducing apparatus which, even when the tension of a magnetic tape varies and the magnetic tape provides a rickety movement in a recording system, can absorb such tension variations and rickety motion to thereby be able to stabilize the traveling motion of the magnetic tape, does not require a separate space for the tension absorbing unit but can use a conventional magnetic recording and reproducing apparatus as it is, and does not need extra time and labor to wind the magnetic tape on the tension absorbing unit.

In attaining the above object, according to the invention as set forth in a first aspect, there is provided a magnetic tape cartridge having: a single reel with a magnetic tape wound thereon; a cartridge case rotatably storing the single reel therein; a tape pull-out leader pin fixed to the leading end portion of the magnetic tape and releasably held within the cartridge case; a tension absorbing unit for absorbing the tension of the magnetic tape disposed inside a holding portion for holding the leader pin.

Also, according to the invention as set forth in a second aspect, in the magnetic tape cartridge as set forth in the first aspect, the tension absorbing unit includes an arm energized by a spring in a direction to absorb the tension of the magnetic tape.

Also, according to the invention as set forth in a third aspect, in the magnetic tape cartridge as set forth in the second aspect, the tension absorbing unit includes: a U-shaped lever; a coil spring wound around one arm portion of the U-shaped lever, one end of the coil spring fixed to the cartridge case, the other end of the coil spring fixed to the U-shaped lever; and a roller mounted on the other arm portion of the U-shaped lever; and wherein the U-shaped lever rotates around the one arm portion with the coil spring and the roller energizes the magnetic tape.

Also, according to the invention as set forth in a fourth aspect, in the magnetic tape cartridge as set forth in the second aspect, the tension absorbing unit includes: two upper and lower parallel plates; two rollers mounted between the two upper and lower parallel plates, the two rollers extended in parallel to each other so as to be rotated; a center shaft penetrating through the two parallel plates and fixed to the cartridge case; and a coil spring wound around the center shaft in such a manner that the center shaft, one end of the coil spring fixed to the center shaft, the other end of the coil spring fixed to the parallel plate, the coil spring always energizes the roller in a given direction with the rotary shaft as a center thereof.

BRIEF DESCRIPTION OF THE DRAWINGS

FIG. 2A shows a tension absorbing unit of a one-roller type and FIG. 2B is a tension absorbing unit of a two-roller type;

DETAILED DESCRIPTION OF THE PREFERRED EMBODIMENTS

Now, description will be given below in detail of an embodiment of a magnetic tape cartridge according to the invention with reference to the accompanying drawings.

Figure 1:
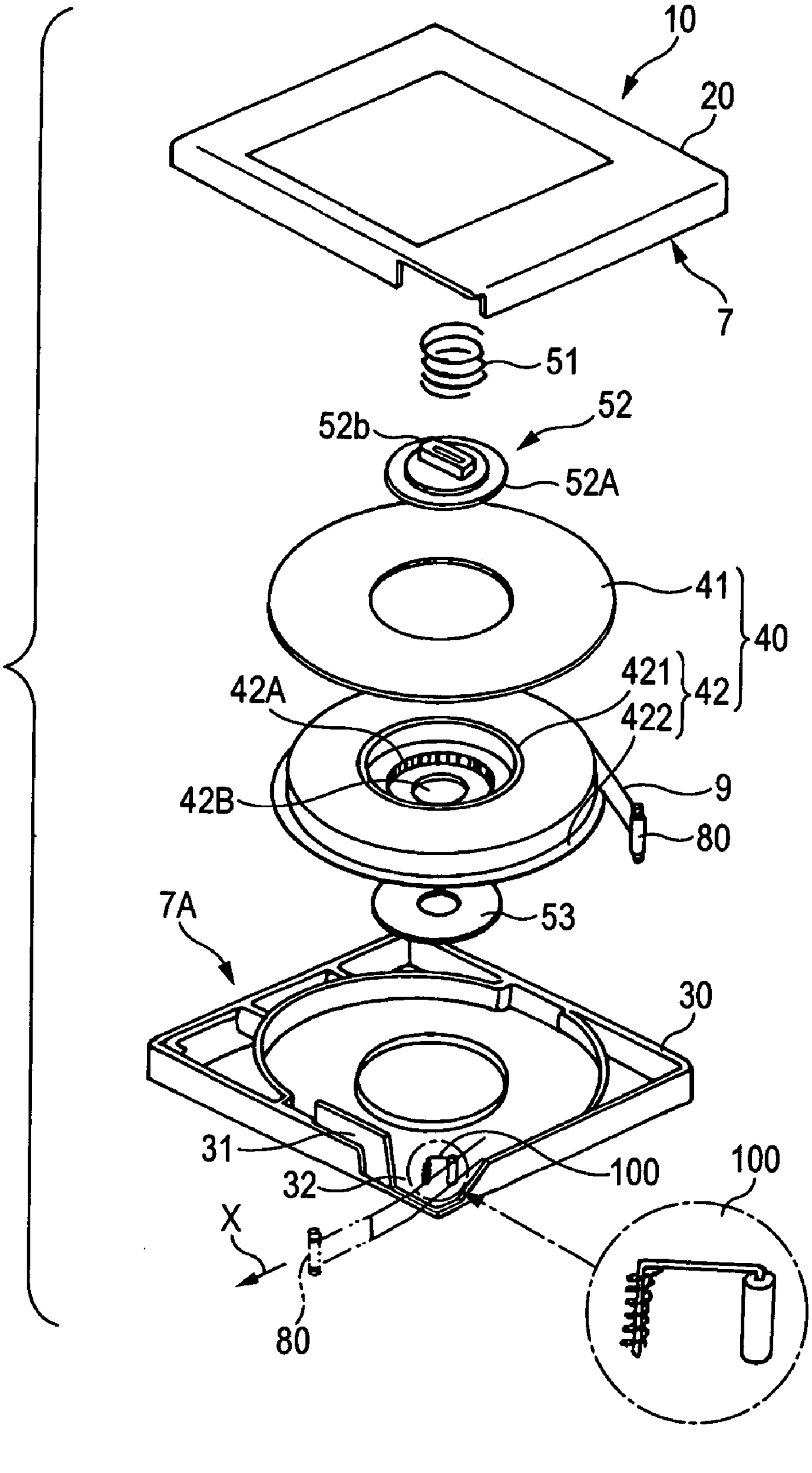
FIG. 1 is an exploded perspective view of an embodiment of a magnetic tape cartridge according to the invention.
Figure 5:
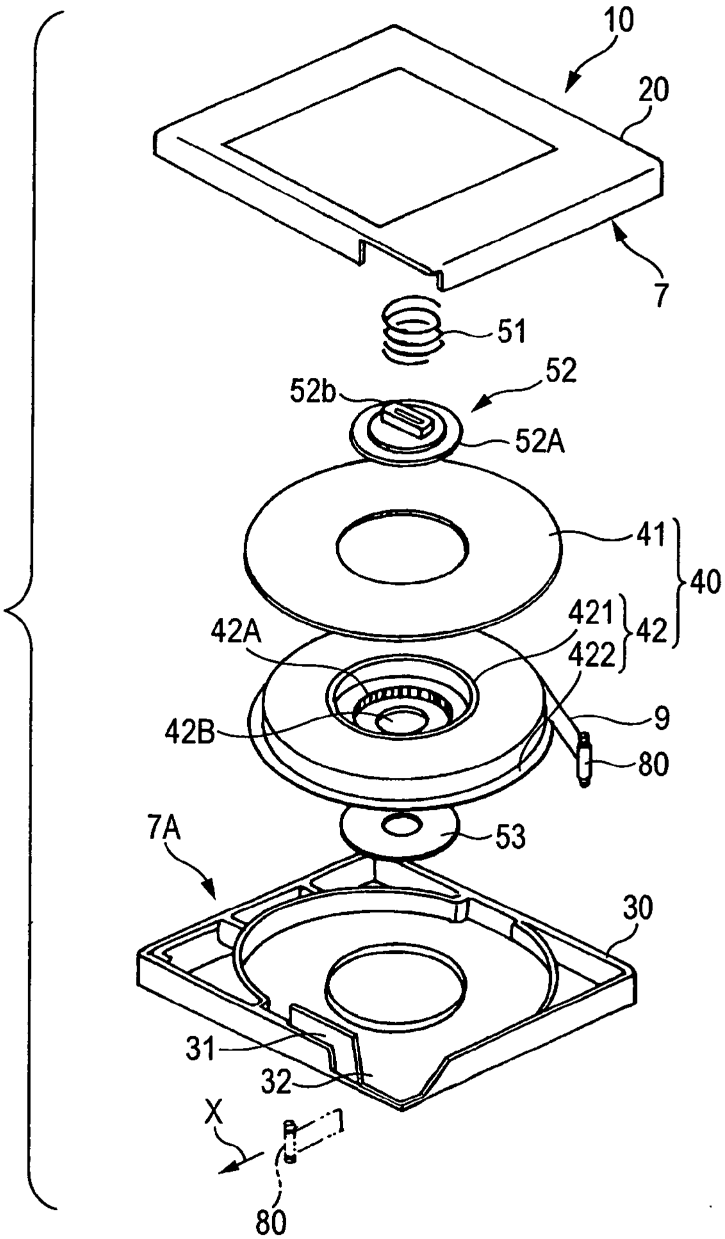
FIG. 5 is an exploded perspective view of an example of a conventional magnetic tape cartridge.
Figure 6:
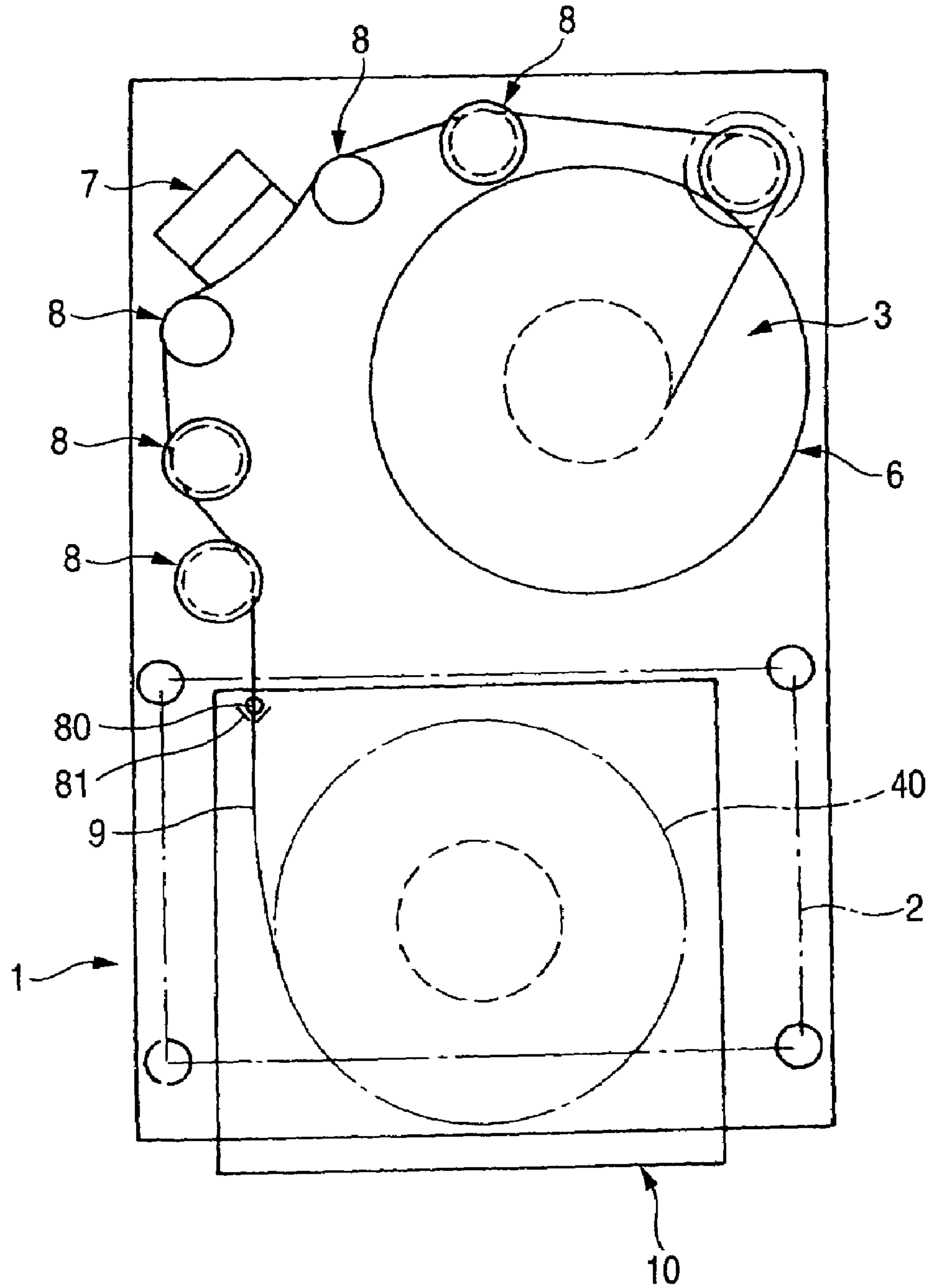
FIG. 6 is a schematic plan view of a recording and reproducing apparatus with the magnetic tape cartridge shown in FIG. 5 mounted therein, explaining the function thereof; and, FIG. 7 is a structure view of a magnetic tape take-up device, showing how to energize the tension of the magnetic tape.
Figure 7:
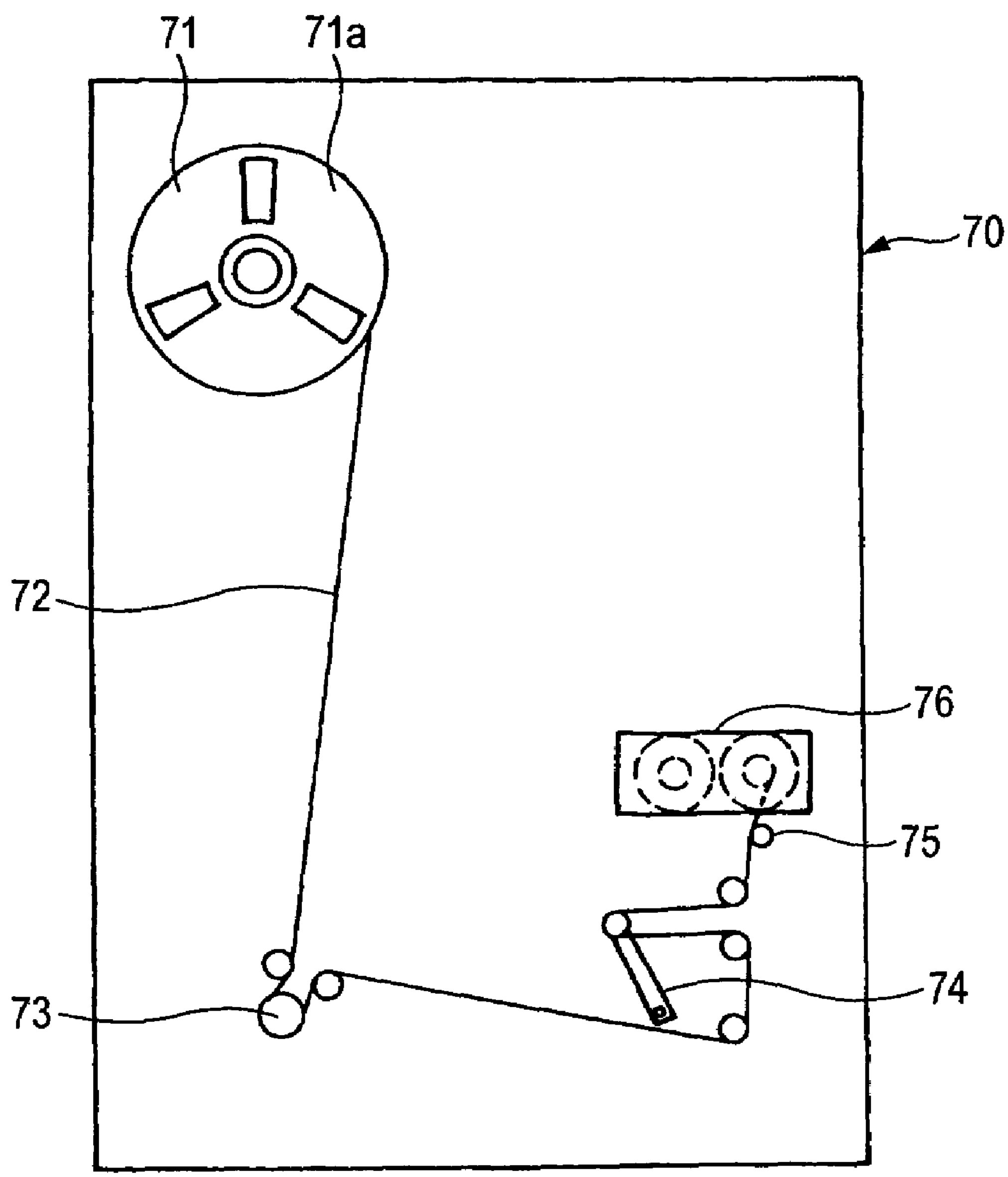

FIG. 1 is an exploded perspective view of an embodiment of a magnetic tape cartridge according to the invention. By the way, in FIG. 1, the same reference numbers as in FIG. 5 designate the same parts and thus the description thereof is omitted here. A magnetic tape cartridge 10 is structured such that a single supply reel 40 composed of an upper reel 41 and a lower reel 42 connected together is rotatably stored in the interior of a cartridge case composed of an upper case 20 and a lower case 30 fastened to each other and a magnetic tape 9 is wound on the supply reel 40. When the magnetic tape cartridge 10 is in use, a slide door 31 is slided to thereby form an opening 32, a leader pin 80 is pulled out from the opening 32 by the drive mechanism of a recording and reproducing apparatus, and the magnetic tape 9 is introduced into a tape traveling passage including the recording part and reproducing part of the recording and reproducing apparatus.

In the portion of the magnetic tape cartridge 10 which is situated in the vicinity of the opening 32 and on the inside of the holding portion of the leader pin 80, there is originally formed an empty space; and, a tension absorbing unit 100 according to the invention is disposed in this empty space.

When the magnetic tape cartridge 10 is in use, in case where the leader pin 80 is pulled out, the magnetic tape 9 is pulled out from the magnetic tape cartridge 10 due to energization of given tension applied by the tension absorbing unit 100; and, since the magnetic tape cartridge 10 is the same in size as a conventional magnetic tape cartridge, not only a conventional magnetic recording and reproducing apparatus can be used as it is but also the tension of the magnetic tape 9 can be absorbed.

Figure 2A:
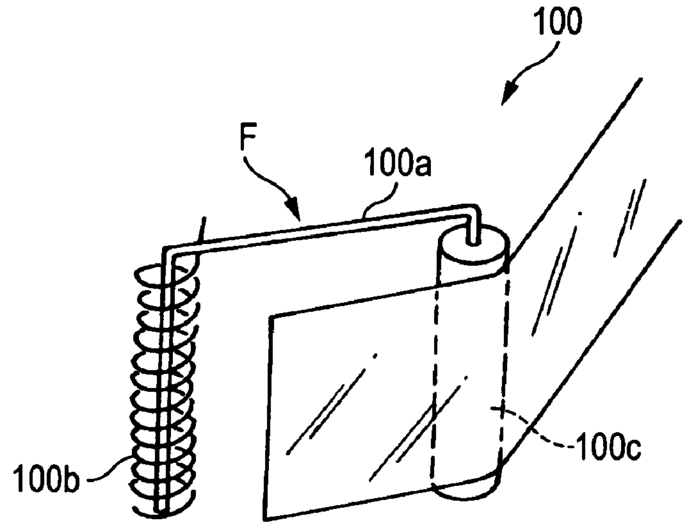
FIGS. 2A and 2B are explanatory perspective views of concrete structures of a tension absorbing unit, specifically.
Figure 2B:
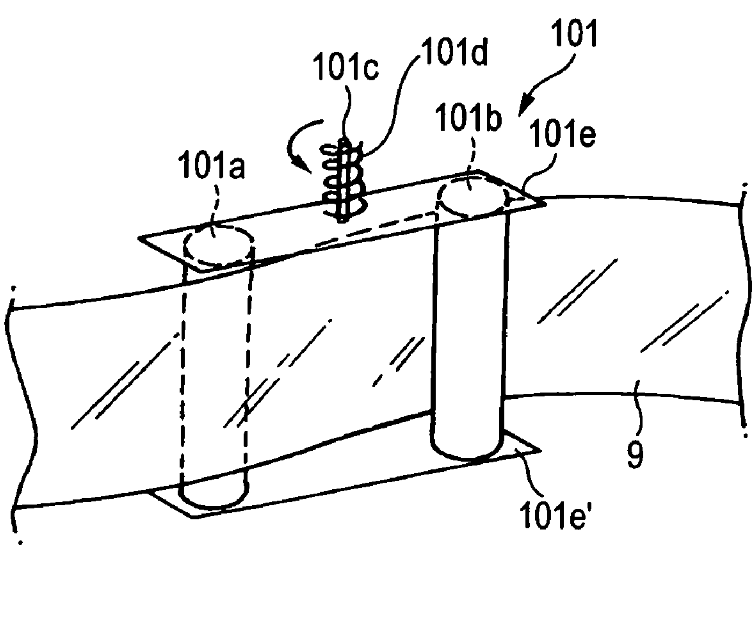

Now, FIGS. 2A and 2B are explanatory perspective views of two specific structures of a tension absorbing unit; and, specifically, FIG. 2A shows a tension absorbing unit of a one-roller type and FIG. 2B shows a tension absorbing unit of a two-roller type.

In FIG. 2A, reference number 100 designates a tension absorbing unit of a one-roller type which, with one end portion of a U-shaped lever 100*a* as a rotary shaft thereof, is swingably fixed in an empty space which is situated in the vicinity of the inside of a leader pin holding portion for holding the leader pin 80 of the lower case 30 of the magnetic tape cartridge 10, and a roller 100*c* is rotatably mounted on the other end portion of the lever 100*a*. And, a coil spring 100*b* is wound around the above-mentioned one end portion of the U-shaped lever 100*a*, one end of the coil spring 100*b* is fixed to the lower case 30 side, the other end thereof is fixed to the intermediate arm side of the U-shaped lever 100*a*, and the roller 100*c* mounted on the leading end portion of the U-shaped lever 10*a* is always energized in a given direction F with the rotary shaft as a center thereof. The magnetic tape 9 is contacted with the roller 100*c* and is passed over the roller 100*c* while the direction thereof is changed by a given angle, and the leader pin 80 mounted on the leading end of the magnetic tape 9 is held on the leader pin holding portion. In this state, the magnetic tape 9 acts so as to return the roller 100*c* in the opposite direction to the energized direction of the roller 100*c*; and, the roller 100*c* is to be held in a position where the roller 100*c* energizing force and the roller returning force balance well.

Now, FIG. 2B shows a tension absorbing unit of a two-roller type.

In the tension absorbing unit 101 of a two-roller type, between two upper and lower parallel plates 101*e*, 101*e*', there are mounted two rollers 101*a*, 101*b* which extend in parallel to each other so as to be rotated. With a center shaft 101*c* penetrating through the two parallel plates 101*e*, 101*e*' as a rotary shaft thereof, the tension absorbing unit 101 is swingably fixed in an empty space which is situated in the vicinity of the leader pin holding portion of the lower case 30. And, a coil spring 101*d* is wound around the center shaft 101*c* in such a manner that the center shaft 101*c* penetrates through the coil spring 101*d*, one end of the coil spring 101*d* is fixed to the parallel plate 101*e*, and the parallel plate 101*e* is always energized in a given direction with the rotary shaft as a center thereof.

The portion of the magnetic tape 9 existing between the two rollers 101*a* and 101*b*, as shown in FIGS. 2A and 2B, is contacted with these rollers and passed over them, and the leader pin 80 mounted on the leading end portion of the magnetic tape 9 is held by the leader pin holding portion. In this state, the magnetic tape 9 is held in a position where the energizing force of the rollers 101*a*, 101*b* and the tensile force of the magnetic tape 9 balance well.

Figure 3:
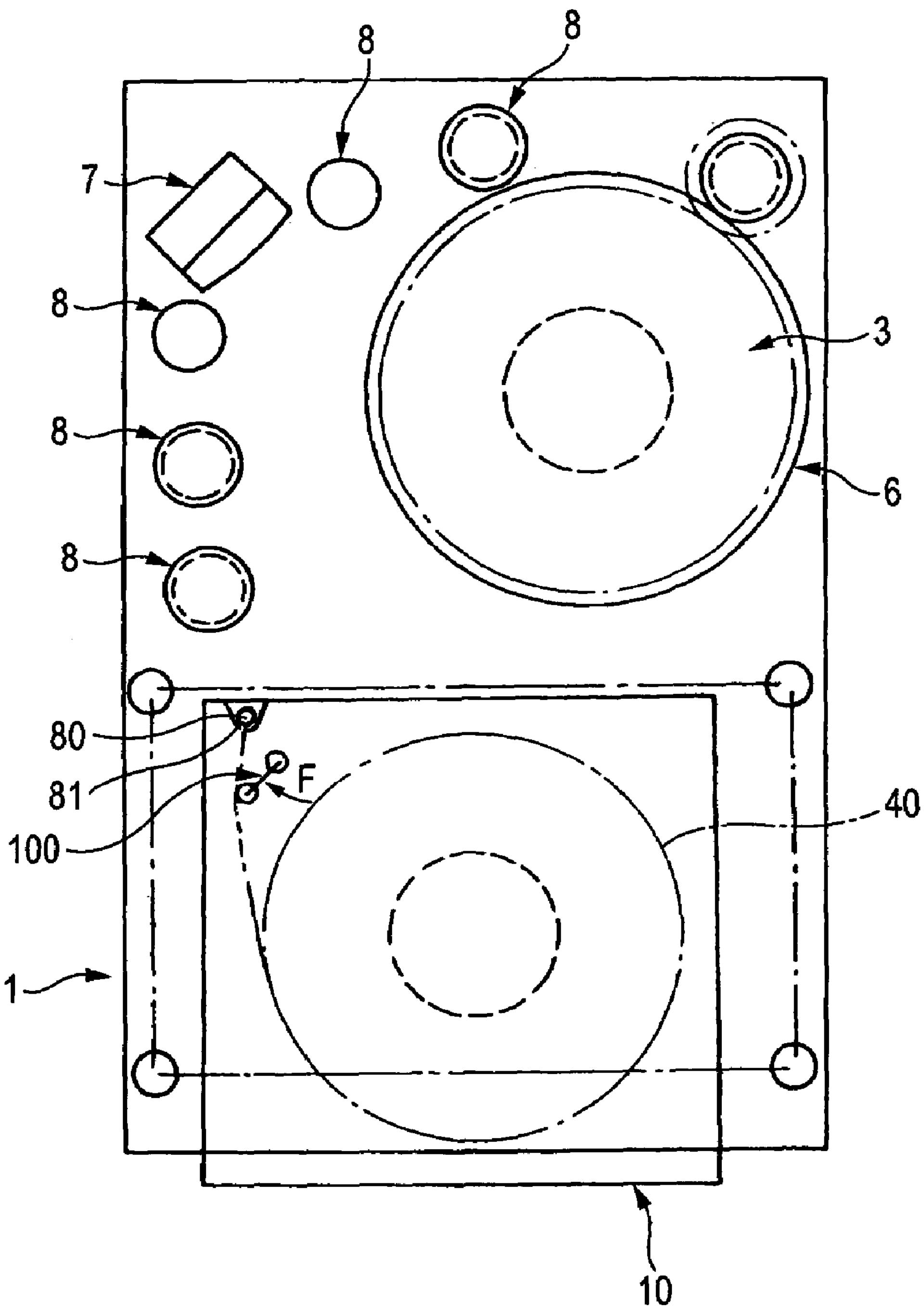
FIG. 3 is a schematic plan view of a recording and reproducing apparatus with the magnetic tape cartridge shown in FIGS. 2A and 2B mounted therein, explaining the function thereof.
Figure 4:
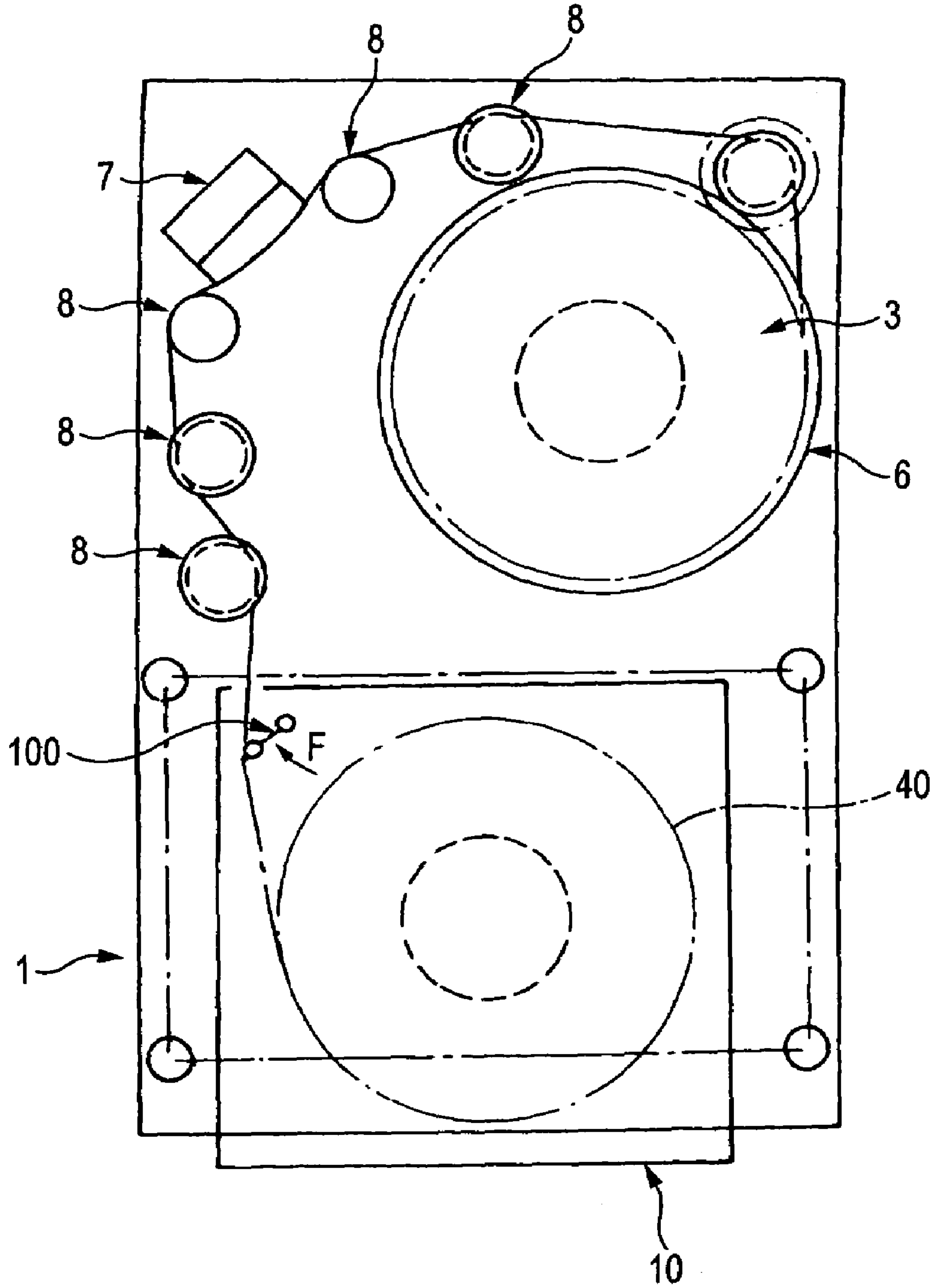
FIG. 4 is a schematic plan view of the recording and reproducing apparatus in which, after mounting of the magnetic tape cartridge in FIG. 3, the magnetic tape is pulled from the magnetic tape cartridge and introduced into a tape traveling passage, explaining the function thereof.

Now, FIGS. 3 and 4 are respectively schematic plan views of a recording and reproducing apparatus using the magnetic tape cartridge 10 shown in FIGS. 2A and 2B, explaining the function of the recording and reproducing apparatus. Specifically, FIG. 3 shows a state in which the magnetic tape cartridge 10 is simply mounted into the recording and reproducing apparatus, and FIG. 4 shows a state in which the tape is pulled out from the magnetic tape cartridge 10 and introduced into a tape traveling passage.

In FIG. 3, in a state in which the magnetic tape cartridge 10 is mounted into the recording and reproducing apparatus 1, the leader pin 80 is held by a leader pin holding portion 81. The magnetic tape 9 is energized by the coil spring of the tension absorbing unit 100, so that a given value of tension is applied to the magnetic tape 9.

Next, in case where the leader pin 80 is removed from the leader pin holding portion 81 and is then wound on the take-up reel 6, as shown in FIG. 4, the magnetic tape 9 travels along the traveling passage from the magnetic tape cartridge 10 and is then wound on the take-up reel 6. In this case, due to the coil spring energization of the tension absorbing unit 100 according to the invention, a given value of tension is continuously applied to the magnetic tape 9.

Now, in case where tension is applied to the magnetic tape 9 in a direction perpendicular to the traveling direction thereof or the magnetic tape 9 is caused to be rickety for some reason, the tension variation component thereof acts so as to press against the roller 100*c* and, therefore, the coil spring 100*b* (FIGS. 2A and 2B) of the tension absorbing unit 100 is energized in the opposite direction to thereby be able to absorb the tension, which makes it possible to secure the traveling stability of the magnetic tape 9.

As has been described heretofore, according to the invention, in a magnetic tape cartridge structured such that a single reel with a magnetic tape wound thereon is rotatably stored within a cartridge case and a tape pull-out leader pin fixed to the leading end portion of the magnetic tape is releasably held within the cartridge case, since a tension absorbing unit for absorbing the tension of the magnetic tape is disposed in a conventional empty space situated on the inside of a holding portion for holding the leader pin, not only a conventional magnetic recording and reproducing apparatus can be used as it is, but also the tension variations and rickety motion of the magnetic tape can be absorbed without requiring a special space to thereby be able to execute high-density recording in a stable manner.

What is claimed is:

1. A magnetic tape cartridge comprising:

a single reel with a magnetic tape wound thereon;

a cartridge case rotatably storing the single reel therein;

a tape pull-out leader pin fixed to the leading end portion of the magnetic tape and releasably held within the cartridge case; and a tension absorbing unit, for absorbing the tension of the magnetic tape, while winding or pulling out the magnetic tape, disposed inside a holding portion for holding the leader pin, wherein the tension absorbing unit includes:

a U-shaped lever;

a coil spring wound around one arm portion of the U-shaped lever, one end of the coil spring fixed to the cartridge case, the other end of the coil spring fixed to the U-shaped lever; and a roller mounted on a second arm portion of the U-shaped lever; and wherein the U-shaped lever rotates around the one arm portion with the coil spring and the roller contacts and energizes the magnetic tape.

2. The magnetic tape cartridge according to claim 1, wherein said tension absorbing unit is fixed in an empty space in a vicinity of an inside portion of the leader pin holding portion.

* * * * *